United States Patent [19]
Johansen

[11] Patent Number: 5,880,580
[45] Date of Patent: Mar. 9, 1999

[54] AUTOMATIC REGULATION OF POWER DELIVERED BY ULTRASONIC TRANSDUCER

[75] Inventor: David K. Johansen, Lake in the Hills, Ill.

[73] Assignee: Dukane Corporation, St. Charles, Ill.

[21] Appl. No.: 15,430

[22] Filed: Jan. 29, 1998

[51] Int. Cl.$^6$ .............. G05F 1/56; B32B 31/18; B23K 1/06
[52] U.S. Cl. ............ 323/282; 156/73.1; 228/110.1
[58] Field of Search .................. 323/282, 351, 323/371; 310/316, 317; 156/73.1, 73.2, 73.3, 73.4, 580.1; 228/1.1, 8, 110.1, 102; 604/22

[56] References Cited

U.S. PATENT DOCUMENTS

| | | | |
|---|---|---|---|
| 4,207,772 | 6/1980 | Stoller | 73/620 |
| 4,277,710 | 7/1981 | Harwood et al. | |
| 4,521,672 | 6/1985 | Fonius | |
| 4,559,826 | 12/1985 | Nelson | |
| 4,587,958 | 5/1986 | Noguchi et al. | |
| 4,696,425 | 9/1987 | Landes | |
| 4,736,130 | 4/1988 | Puskas | 310/316 |
| 4,746,051 | 5/1988 | Peter | |
| 4,824,005 | 4/1989 | Smith, Jr. | 228/1.1 |
| 4,864,574 | 9/1989 | Pritt | |
| 4,888,565 | 12/1989 | Littleford et al. | |
| 5,153,486 | 10/1992 | Hirotomi | |
| 5,213,249 | 5/1993 | Long et al. | 228/102 |
| 5,276,376 | 1/1994 | Puskas | |
| 5,394,047 | 2/1995 | Scharlack et al. | |
| 5,406,051 | 4/1995 | Lai | |
| 5,425,704 | 6/1995 | Sakurai et al. | |
| 5,442,538 | 8/1995 | Ikeda et al. | |
| 5,777,860 | 7/1998 | Halbert | 363/34 |

*Primary Examiner*—Adolf Deneke Berhane
*Attorney, Agent, or Firm*—Emrich & Dithmar

[57] ABSTRACT

An ultrasonic generator has an output circuit for delivering ultrasonic power to a load through a transducer, the generator having an amplitude control input coupled to the output of a comparator, the inputs of which are coupled to a user interface circuit. The output circuit produces voltage and current signals which are applied to a multiplier in the interface circuit, which produces a power signal applied to an error input of the comparator, the interface circuit also having a signal processor which receives a user-input reference and applies it to a reference input of the comparator. The output of the comparator regulates the power output of the generator to the reference level, and is also coupled to an indicator circuit for providing an visual indication of whether or not the apparatus is in regulation.

7 Claims, 2 Drawing Sheets

AUTOMATIC REGULATION OF POWER DELIVERED BY ULTRASONIC TRANSDUCER

BACKGROUND OF THE INVENTION

1. Field of the Invention

The invention relates to ultrasonic generators and, in particular, to improve regulation of a generator for driving an ultrasonic transducer used in welding.

2. Description of the Prior Art

Ultrasonic generators for operating transducer/horn assemblies for various ultrasonic applications, such as the welding of plastic parts or the like, are well known. One such generator, which uses pulse-width modulation to control the power output level, is disclosed in U.S. Pat. No. 4,277,710, and is a high-power generator including a transistor bridge inverter circuit connected to a DC source for producing an alternating output current. The ultrasonic power output from that generator can be varied by varying the conduction pulse width of the power conversion circuit, which varies the output voltage to the transducer, thereby varying the ultrasonic amplitude of the transducer stack. Initially, the power (pulse width) of that generator was controlled with a front panel control knob. However, Dukane Corporation, the assignee of U.S. Pat. No. 4,277,710 has also produced a user interface, in the nature of a remote power control option board, that can control the ultrasonic power output remotely through an isolated 4–20 ma current loop signal, which allows users to adjust the power output (pulse width) to suit their processing needs. Typically, the remote power control option is used to control a continuous ultrasonic process, and usually utilizes an ultrasonic wattmeter or a separate energy module to monitor the power level of the ultrasonic process.

Particularly in applications where a number of ultrasonic generating units are used, under common control of a programmable logic controller (PLC), the PLC has been used to monitor the power output signal and to control the 4–20 ma current loop signal to the remote power control board input to regulate the generator pulse width to the desired power output level, in an arrangement similar to that illustrated in FIG. 1. While this method works well for certain ultrasonic processes, the reaction time to process variations is relatively slow, with response times of hundreds to thousands of milliseconds to correct for errors. Furthermore, the external PLC is an expensive item and, while it is necessary in the control of multiple ultrasonic systems, it adds unnecessarily to the cost and complexity of the power control of any one system. Furthermore, special system programming is needed for such PLCs and, if the programming is flawed, the regulation level may contain uncontrolled spurious oscillations.

SUMMARY OF THE INVENTION

It is a general object of the invention to provide an apparatus for regulating the output level of an ultrasonic generator, which avoids the disadvantages of prior systems while affording additional structural and operating advantages.

An important feature of the invention is the provision of an apparatus for controlling the output of an ultrasonic generator which utilizes power regulation rather than amplitude regulation.

In connection with the foregoing feature, a further feature of the invention is the provision of an apparatus of the type set forth, wherein the regulation circuitry is integrated with the generator device, and does not require any external controller.

In connection with the foregoing features, a further feature of the invention is the provision of an apparatus of the type set forth, which utilizes existing user interface circuitry for the ultrasonic generator.

A still further feature of the invention is the provision of apparatus of the type set forth, which provides an indication of whether or not the apparatus is in regulation.

Certain ones of these and other features of the invention may be attained by providing apparatus for regulating ultrasonic power delivered to a load through a transducer, the apparatus comprising: a generator for producing AC power at a predetermined ultrasonic frequency and having an amplitude control input, an output circuit coupled between the generator and an associated transducer for delivering ultrasonic power to a load, a power control circuit including a comparator having a reference power input and an error power input and an output coupled to the amplitude control input of the generator, a user interface circuit coupled to the power control circuit and including a signal processing circuit and a multiplier circuit, the output circuit including means generating current and voltage signals respectively representative of the current and voltage delivered to the transducer, and feedback means coupling the current and voltage signals respectively to inputs of the multiplier circuit, the multiplier circuit having a power output coupled to the error power input of the comparator, the signal processing circuit having an input for receiving a user-set power reference level and an output coupled to the reference power input of the comparator, whereby the power delivered to the load is regulated to the power reference level.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
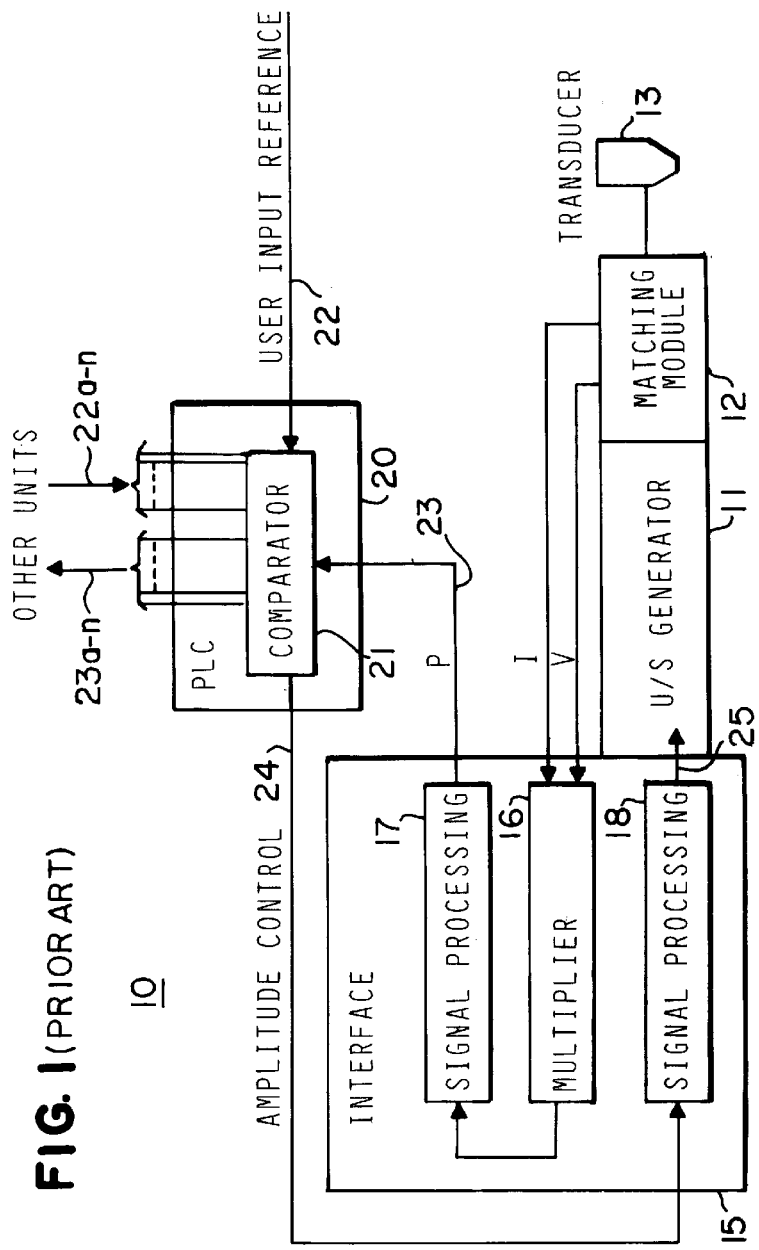
FIG. 1 is a functional block diagrammatic view of a system utilizing a prior art regulation scheme.

Referring to FIG. 1, there is illustrated a prior art ultrasonic system, generally designated by the numeral 10, of the type which may be used for ultrasonic applications, such as welding or the like. The system 10 includes an ultrasonic generator 11, which may be of the type disclosed in U.S. Pat. No. 4,277,710, which utilizes pulse-width modulation techniques to control the output power. The system 10 includes an output circuit including a matching module 12, coupled to a transducer 13 for coupling ultrasonic energy to an associated load (not shown), all in a known manner. The system 10 is also provided with a user interface 15, which may be a specialized circuit board adapted for connection to the generator 11. The interface 15 includes a multiplier 16, the output of which is connected to a signal processing circuit 17, and also includes a signal processing circuit 18.

The system 10 also includes an external PLC 20, which operates under stored program control for controlling the system 10 as well as a plurality of similar ultrasonic units. More particularly, the PLC 20 includes a comparator 21 which has a reference input 22 for a user to set the desired power level, and a power input 23 from the output of the signal processing circuit 17 of the user interface 15. The output of the comparator 21 is applied on an amplitude control line 24 to the input of the signal processing circuit 18, the output of which is applied on line 25 to the amplitude control input of the ultrasonic generator 11. The comparator 21 is also coupled to the reference inputs and error inputs of other units, respectively by lines 22a-n and 23a-n. Signals respectively representative of the current and voltage applied to the transducer 13 are derived from the matching module 12 and respectively applied to the two inputs of the multiplier circuit 16, which multiplies these signals to produce a power output signal which, after processing at 17, is applied to the comparator 21 as an error signal input which is compared to the reference power level. The difference between these two inputs is applied as the amplitude control signal to adjust the power output of the ultrasonic generator 11, to regulate it to the user input reference level.

As was indicated above, while this system is workable, it has a number of significant disadvantages, including complexity, high cost and slow response speed.

Figure 2:
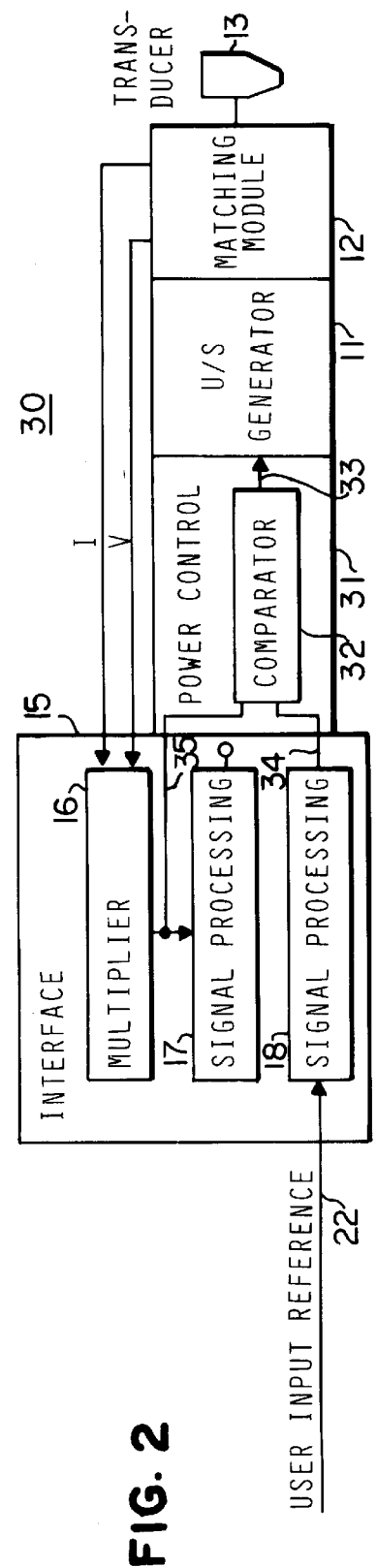
FIG. 2 is a view similar to FIG. 1, illustrating the power regulation apparatus of the present invention.

Referring now to FIG. 2, there is illustrated an ultrasonic system 30 in accordance with the present invention, which is similar in certain respects to the ultrasonic system 10 and, accordingly, like parts have like reference numbers. The system 30 includes the same ultrasonic generator 11, matching module 12, transducer 13 and user interface 15, as was described above for the system 10. However, in this case the output of the signal processing circuit 17 is disconnected and the input of the signal processing circuit 18 is coupled to the user reference input 22. The system 30 also includes a power control circuit 31 connected between the user interface 15 and the ultrasonic generator 11. More particularly, the power control circuit 31 includes a comparator 32, which has an output 33 connected to the amplitude control input of the ultrasonic generator 11. The comparator 32 has a reference power input 34 connected to the output of the signal processing circuit 18, and an error power input 35 connected directly to the output of the multiplier 16. There is no need for the external PLC 20.

Figure 3:
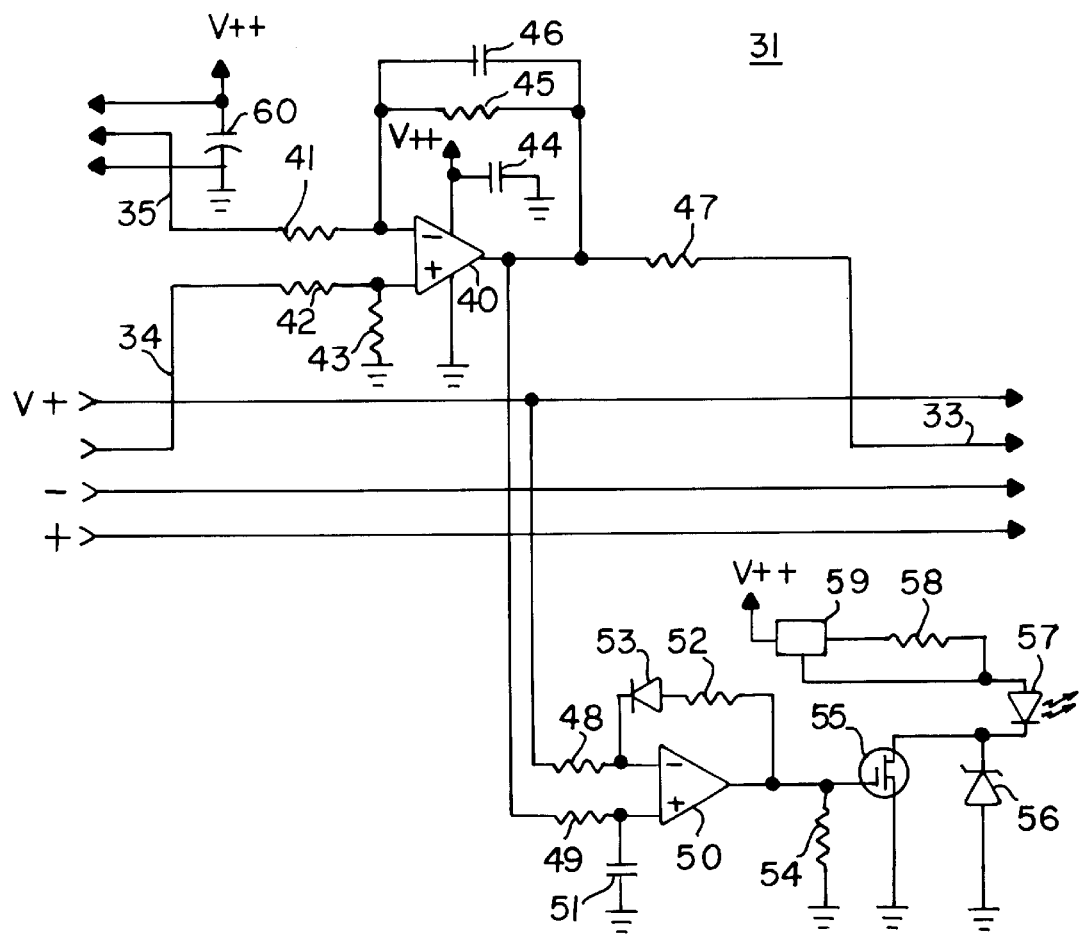
FIG. 3 is a schematic circuit diagram of the power control circuit of FIG. 2.

The details of the power control circuit 31 are illustrated in FIG. 3. More particularly, the comparator 32 includes an operational amplifier 40, the inverting input of which is connected through a resistor 41 to the error power input 35, and the non-inverting input of which is connected through a resistor 42 to the reference power input 34, and also through a resistor 43 to ground, the resistors 42 and 43 forming a voltage divider. The output of the op amp 40 is connected to the inverting input thereof through a gain resistor 45 and a compensating filter capacitor 46, and is also connected through a resistor 47 to the amplitude control output 33. The comparator 32 functions substantially in the same manner as was described above for the comparator 21, serving to regulate the output power of the ultrasonic generator 11 to the user-input reference power level. However, in this case, since the PLC is eliminated, and the power control circuit 31 is integrated with the ultrasonic generator 11, the system responds to process variations 20 to 100 times faster than the system 10, and is much more economical.

The power control circuit 31 also includes a circuit to indicate whether or not the system is in regulation. More particularly, there is provided an op amp 50, the inverting input of which is connected through a resistor 48 to a V+ supply, which may be a 5.1 VDC supply, as a reference level. The non-inverting input of the op amp 50 is connected through a resistor 49 to the output of the op amp 40, and is also connected through a filter capacitor 51 to ground. The output of the op amp 50 is connected through a gain control resistor 52 and a diode 53 to the inverting input, and is also connected through a resistor 54 to ground. The output of the op amp 50 is also connected to the gate of a MOSFET switch 55, the drain of which is grounded and the source of which is connected to the cathode of an LED 57. A Zener diode 56 is connected across the source-drain junction of the MOSFET 55 for protection. The anode of the LED 57 is connected through a resistor 58 to the output terminal of a three-terminal regulator 59, and is connected directly to the adjusting terminal thereof, the input terminal of the regulator 59 being connected to a V++ supply voltage, such as a 12 VDC source. Thus, the regulator 59 is connected as a current source for the LED 57.

In operation, the V+ reference supply voltage represents 100% power output, and if the regulating output from the comparator 32 exceeds that reference, the MOSFET 55 is turned on, illuminating the LED 57, to indicate that the system is out of regulation.

The power control circuit 31 may be on a circuit board to which the V++ supply voltage is applied in parallel with a filter capacitor 60. The op amps 40 and 50 may comprise a dual op amp chip, to which the V++ supply voltage is applied in parallel with a filter capacitor 44.

From the foregoing, it can be seen that there has been provided an improved power regulation circuit for an ultrasonic generating system, which is integrated with the ultrasonic generator, is of simple and economical construction and provides high-speed response to process variations.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for regulating ultrasonic power delivered to a load through a transducer, said apparatus comprising:
   a generator for producing AC power at a predetermined ultrasonic frequency and having an amplitude control input,
   an output circuit coupled between said generator and an associated transducer for delivering ultrasonic power to a load,
   a power control circuit including a comparator having a reference power input and an error power input and an output coupled to the amplitude control input of said generator, a user interface circuit coupled to said power control circuit and including a signal processing circuit and a multiplier circuit, said output circuit including means generating current and voltage signals respectively representative of the current and voltage delivered to the transducer, and feedback means coupling said current and voltage signals respectively to inputs of said multiplier circuit, said multiplier circuit having a power output coupled to the error power input of said comparator, said signal processing circuit having an input for receiving a user-set power reference level and an output coupled to the reference power input of said comparator, whereby the power delivered to the load is regulated to said power reference level.

2. The apparatus of claim 1, and further comprising: an indicator circuit for providing an indication of whether or not the apparatus is in regulation.

3. The apparatus of claim 2, wherein said indicator circuit includes a light-emitting diode.

4. Apparatus for regulating ultrasonic power delivered to a load through a transducer, said apparatus comprising:

a generator for producing AC power at a predetermined ultrasonic frequency and having an amplitude control input, an output circuit coupled between said generator and an associated transducer for delivering ultrasonic power to a load, a power control circuit including a comparator having a reference power input and an error power input and an output coupled to the amplitude control input of said generator, an indicator circuit coupled to the output of said power control circuit and including a light source for providing an visual indication of whether or not said apparatus is in regulation, a user interface circuit coupled to said power control circuit and including a signal processing circuit and a multiplier circuit, said output circuit including means generating current and voltage signals respectively representative of the current and voltage delivered to the transducer, and feedback means coupling said current and voltage signals respectively to inputs of said multiplier circuit, said multiplier circuit having a power output coupled to the error power input of said comparator, said signal processing circuit having an input for receiving a user-set power reference level and an output coupled to the reference power input of said comparator, whereby the power delivered to the load is regulated to said power reference level.

5. The apparatus of claim 4, wherein said comparator is a first comparator, said indicator circuit including a second comparator which compares the output of said first comparator to a reference signal representative of full power.

6. The apparatus of claim 5, wherein said indicator circuit further includes a switching device coupled to the output of said second comparator for providing an energizing signal to said light source when the output of said first comparator exceeds the reference signal.

7. The apparatus of claim 6, wherein said indicator circuit further includes a Zener diode connected across said switching element.

* * * * *